United States Patent
Mittal et al.

(10) Patent No.: US 7,726,560 B2
(45) Date of Patent: Jun. 1, 2010

(54) SYSTEM AND METHOD FOR MANAGING INFORMATION OF ACCOUNTS

(75) Inventors: Manish Mittal, Uttar Pradesh (IN); Puspendra Jaitly, New Delhi (IN); Sushil K. Keswani, Delhi (IN); Puneet P. Chhabra, Haryana (IN)

(73) Assignee: American Express Travel Related Services Company, Inc., New York, NY (US)

( * ) Notice: Subject to any disclaimer, the term of this patent is extended or adjusted under 35 U.S.C. 154(b) by 809 days.

(21) Appl. No.: 11/337,082

(22) Filed: Jan. 23, 2006

(65) Prior Publication Data

US 2007/0175973 A1    Aug. 2, 2007

(51) Int. Cl.
*G06K 5/00* (2006.01)
(52) U.S. Cl. ................................ 235/380; 235/379
(58) Field of Classification Search ............... 235/379, 235/380; 705/35, 36 R
See application file for complete search history.

(56) References Cited

U.S. PATENT DOCUMENTS

| | | | |
|---|---|---|---|
| 4,305,059 A | 12/1981 | Benton | |
| 5,237,159 A * | 8/1993 | Stephens et al. | 705/30 |
| 6,154,753 A | 11/2000 | McFarland | |
| 6,606,606 B2 * | 8/2003 | Starr | 705/36 R |
| 7,389,256 B1 * | 6/2008 | Adams et al. | 705/35 |
| 2003/0236728 A1 * | 12/2003 | Sunderji et al. | 705/35 |
| 2004/0049445 A1 | 3/2004 | Kishore | |
| 2006/0241991 A1 | 10/2006 | Pudhukottai et al. | |
| 2007/0043639 A1 * | 2/2007 | Tabs et al. | 705/35 |
| 2007/0185856 A1 | 8/2007 | Mittal et al. | |

OTHER PUBLICATIONS

Behrens, Jeff, "Lotus Notes: Are the Benefits Worth the Cost?"; Mar. 6, 1995; *Mass High Tech*; vol. 13, No. 6, pp. 1-2.
Office Action, mailed Oct. 22, 2007 for U.S. Appl. No. 11/337,083, filed Jan. 23, 2006, 18 pages.
Rosenberg, J., "Dictionary of Computers, Information Processing and Telecommunications—$2^{nd}$ Edition", John Wiley & Sons; 1987; pp. 519, 688.

* cited by examiner

*Primary Examiner*—Ahshik Kim
(74) *Attorney, Agent, or Firm*—Snell & Wilmer L.L.P.

(57) ABSTRACT

Information such as financial information related to one or more accounts of one or more business units is compiled. The compiled information is converted into a predefined format and is uploaded on a database. One or more views of the information included in the database are generated based on user privileges. Customized views of the information are used by one or more users to monitor the performance of business units.

10 Claims, 7 Drawing Sheets

SYSTEM AND METHOD FOR MANAGING INFORMATION OF ACCOUNTS

BACKGROUND OF THE INVENTION

1. Field of the Invention

The present invention generally relates to information management systems. More particularly, the invention relates to management of information related to one or more business units of an organization.

2. Related Art

With the growth of business, a large amount of information is generated by different business units in an organization. To monitor the performance of the business units and to establish compliance with several regulatory standards, the information related to the business units needs to be managed in an efficient manner. The information usually includes balance sheet accounts including information related to the financial matters and processes of the business units. The performance of a business unit is monitored and analyzed by authorities responsible for the finances of the business units. Examples of the authorities may include account owners, process owners, or the like.

In an existing solution, an information management team compiles the information related to the business units and sends it to the corresponding account owners via electronic mail. The account owners review the information and communicate with the information management team if any modification needs to be made. Therefore, in this existing solution, a large number of emails are exchanged between the information management team and the authorities responsible for the business units. Moreover, the size of the emails may be large due to the amount of information that needs to be sent to the account owners. Also, the information needs to be converted to different formats for different account owners. This requires considerable effort from the information management team. Further, the account owners are dependent on the information management team for the updates on the information related to the business units. The existing solutions also require a considerable amount of time and do not ensure the security of the information.

Given the foregoing, what is needed is a system, method and computer program product for managing information related to one or more business units of an organization, which will overcome the deficiencies of existing systems.

BRIEF SUMMARY OF THE INVENTION

The present invention meets the identified needs, mentioned above, by providing a system, method and computer program product for managing information related to accounts of one or more business units in an organization.

An advantage of the present invention is that it automates the process of making the information related to accounts of one or more business units available to a user.

Another advantage of the present invention is that it provides different views of the information to different users based on user privileges.

Yet another advantage of the present invention is that it reduces the manual intervention and the exchange of e-mails required to compile and present the information related to the business units.

Various embodiments of the present invention provide a method for managing information related to accounts of one or more business units of an organization. In an embodiment of the invention, the accounts of one or more business units include balance sheet accounts. The balance sheet accounts include financial information related to the business units. The information related to the accounts is compiled by an information management team. The compiled information is converted into a predefined format and is presented to users based on each user's privileges. Further, the compiled information may be regularly updated by the information management team.

BRIEF DESCRIPTION OF THE DRAWINGS/FIGURES

The features and advantages of the present invention will become more apparent from the detailed description set forth below, when taken in conjunction with the drawings, in which like reference numbers indicate identical or functionally similar elements. Additionally, the left most digit of a reference number identifies the drawing in which the reference number first appears.

DETAILED DESCRIPTION OF THE INVENTION

I. Overview

The present invention is directed to a system, method and computer program product for managing information related to one or more accounts of one or more business units in an organization. The information related to the accounts of one or more business units, for example, financial information, is compiled by an information management team. The information is reconciled and consolidated into a database in one or more formats. Further, the information is presented to one or more users, based on the privileges of the users.

The present invention is now described in more detail herein in terms of an exemplary embodiment. This is for convenience only and is not intended to limit the application of the present invention. In fact, after reading the following description, it will be apparent to one skilled in the relevant art(s) how to implement the following invention in alternative embodiments (e.g., various information formats, various software and hardware platforms being used, the mode of implementation of the invention, end use of the invention, etc.).

The terms "user", "global owner", "account owner", "process owner", and/or the plural form of these terms are used interchangeably throughout herein to refer to those persons or entities capable of accessing, using, being affected by and/or benefiting from the tool that the present invention provides for management of information related to one or more accounts.

II. System

Figure 1:
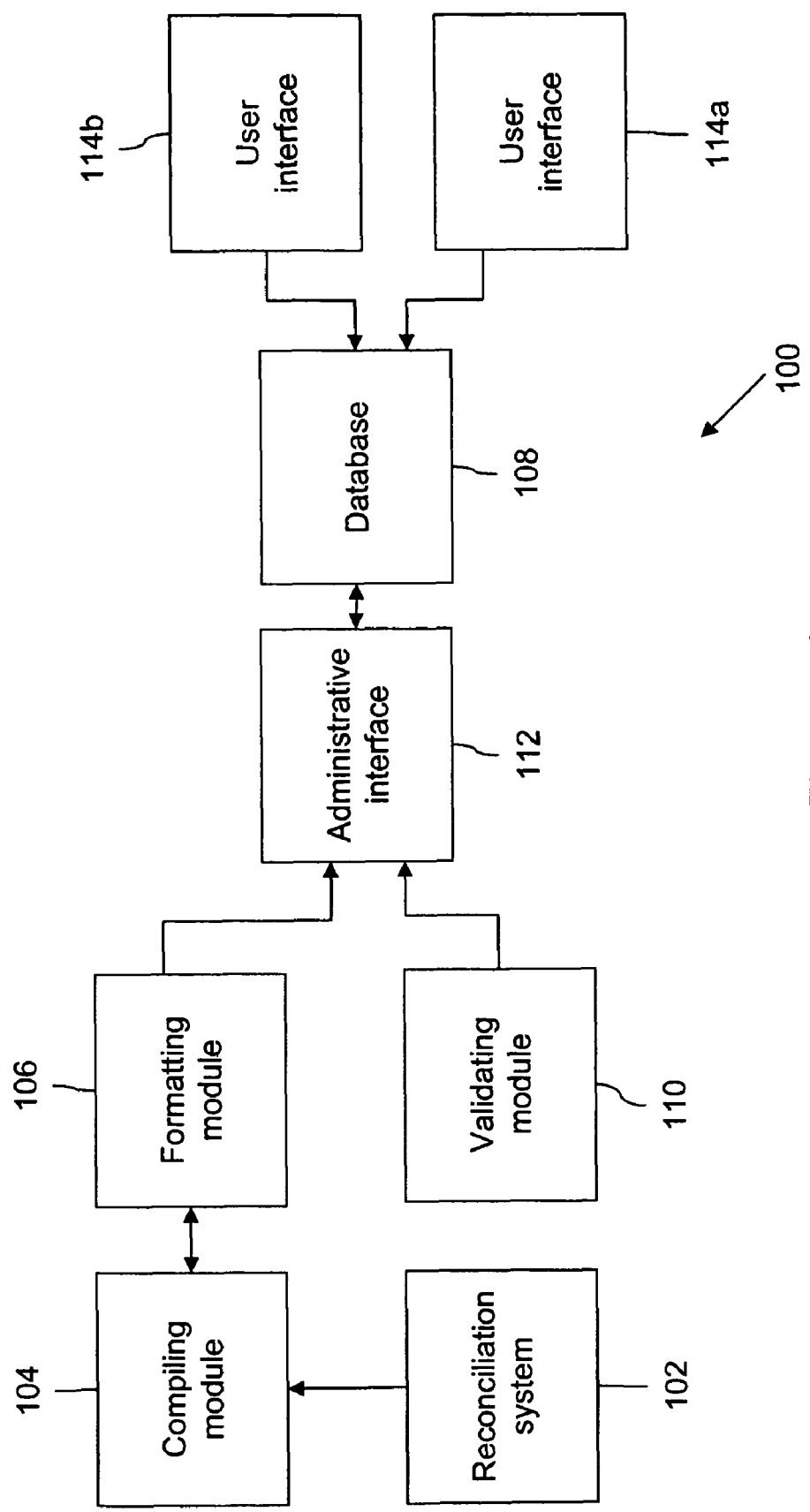
FIG. 1 is a block diagram of an exemplary system according to an embodiment of the invention.

FIG. 1, is a block diagram providing an overview of an exemplary system 100. In accordance with an embodiment of the invention, system 100 manages information related to one or more accounts. The accounts may include one or more balance sheet accounts, which may include the financial information related to one or more business units of an organization.

System 100 includes a reconciliation system 102, a compiling module 104, a formatting module 106, a database 108, a validating module 110, an administrative interface 112, and a plurality of user interfaces 114 such as user interfaces 114a, 114b.

Reconciliation system 102 reconciles information related to the accounts of the business units. Reconciliation of the information may include, for example, checking the validity of the information. Compiling module 104 consolidates the reconciled information in one or more consolidated files in a first predefined format. For example, the reconciled information may be consolidated in a Microsoft (MS) Excel format. Formatting module 106 formats the consolidated files to a second predefined format. Thereafter, formatting module 106 uploads the consolidated files in the second predefined format on database 108 by using administrative interface 112. The second predefined format may include, for example, an MS Excel format, an MS Access format, a Lotus 123 version 4 spreadsheet (WK4) format, or the like. The second predefined format may be selected based on, for example, the type of database 108 being used. For example, in the case where database 108 is a Lotus Notes database, the consolidated files in an MS Excel format may be converted to a WK4 format before being uploaded on database 108.

Validating module 110 validates the information uploaded on database 108 by using administrative interface 112. In accordance with an embodiment of the invention, validating the information may include, for example, comparing the uploaded information with predefined standards, checking the accuracy of the uploaded information, or the like. In accordance with an embodiment of the invention, the predefined standards may include, for example, Global Card Data Financial standards (contour direction features—CDF88). Validating module 110 also initiates corrective measures if the formatted information does not comply with the predefined standards. The corrective measures may include, for example, reformatting the information.

User interfaces 114 may be used by one or more users to view the validated information included in database 108. The users may include, for example, authorities responsible for one or more of the business units. User interfaces 114 may be used to provide different views of the information included in database 108 to different users, based on access privileges of the users. The access privileges may be based on the category of the users. The users may be separated into various categories based on, for example, the hierarchy of the organization, the position of the user in the organization, or the like. An example of the users may include account owners, who are responsible for finances or processes related to the business units. Another example of the users may include process owners, who are less privileged users and may not be authorized to view all the information related to the business units. The different views of the information represented by user interfaces 114 are explained in detail in conjunction with FIGS. 4 and 6.

In accordance with an embodiment of the invention, system 100 may be implemented in a computational network. Examples of the computational network may include a Local Area Network, a Wide Area Network, an Intranet of an organization, the Internet, or the like. The computational network includes a plurality of interconnected computational devices such as computers, PDAs, or the like. In accordance with an embodiment of the invention, database 108 may be implemented in a host server (e.g., a computer system such as computer system 700 shown in FIG. 7). Administrative interface 112 and user interfaces 114 may be accessed by using one or more administrative systems (e.g., computer systems such as computer system 700 shown in FIG. 7) and user systems (e.g., a computer systems such as computer system 700 shown in FIG. 7), respectively. Database 108 may be connected to the administrative systems and user systems through a computational network. In accordance with various embodiments of the invention, the host server, the administrative systems and the user systems are similar in nature and type, and may include any of the aforementioned computational devices. The functionality of the administrative systems, user systems and the host server is explained in detail in conjunction with FIG. 7.

In accordance with an embodiment of the invention, system 100 may also include an updating module (not shown in FIG. 1) for updating the information included in database 108. Updating module updates database 108 by using administrative interface 112. The updating may be performed after a predefined time interval, for example, monthly.

In accordance with an embodiment of the invention, the computational network may be a secured computational network. The computational network may be secured by using a security model such as a zone-based security model, a session-based security model, or the like. In accordance with an embodiment of the present invention, the security model may be used for authenticating each user before the user may, for example, access at least one of user interfaces 114.

In accordance with an embodiment of the invention, database 108 may be created on various platforms such as Oracle, Domino, MS Access, My Structured Query Language (My SQL), or the like. In accordance with an embodiment of the invention, database 108 may be a Lotus Notes database.

In accordance with an embodiment of the invention, user interfaces 114 may include links to one or more reports on the information related to the balance sheet accounts. The reports may be, for example, a summary level report, a market level report, a detailed description, or the like.

In accordance with various embodiments of the invention, administrative interface 112 and each of user interfaces 114 may be, for example, a Graphical User Interface (GUI), an Application Program Interface (API), or the like. Further, user interfaces 114 and administrative interface 112 may be implemented by using, for example, Hyper Text Markup Language (HTML) documents, java applets, javascripts, Active Server Pages (ASP), Common Gateway Interface (CGI) scripts, extensible markup language (XML), dynamic HTML, Cascading Style Sheets (CSS), plug-ins, or the like.

In accordance with various embodiments of the invention, elements of system 100 such as reconciliation system 102, compiling module 104, formatting module 106, and validating module 110 may be implemented as software modules, hardware modules, a firmware or a combination thereof.

III. Process

Figure 2:
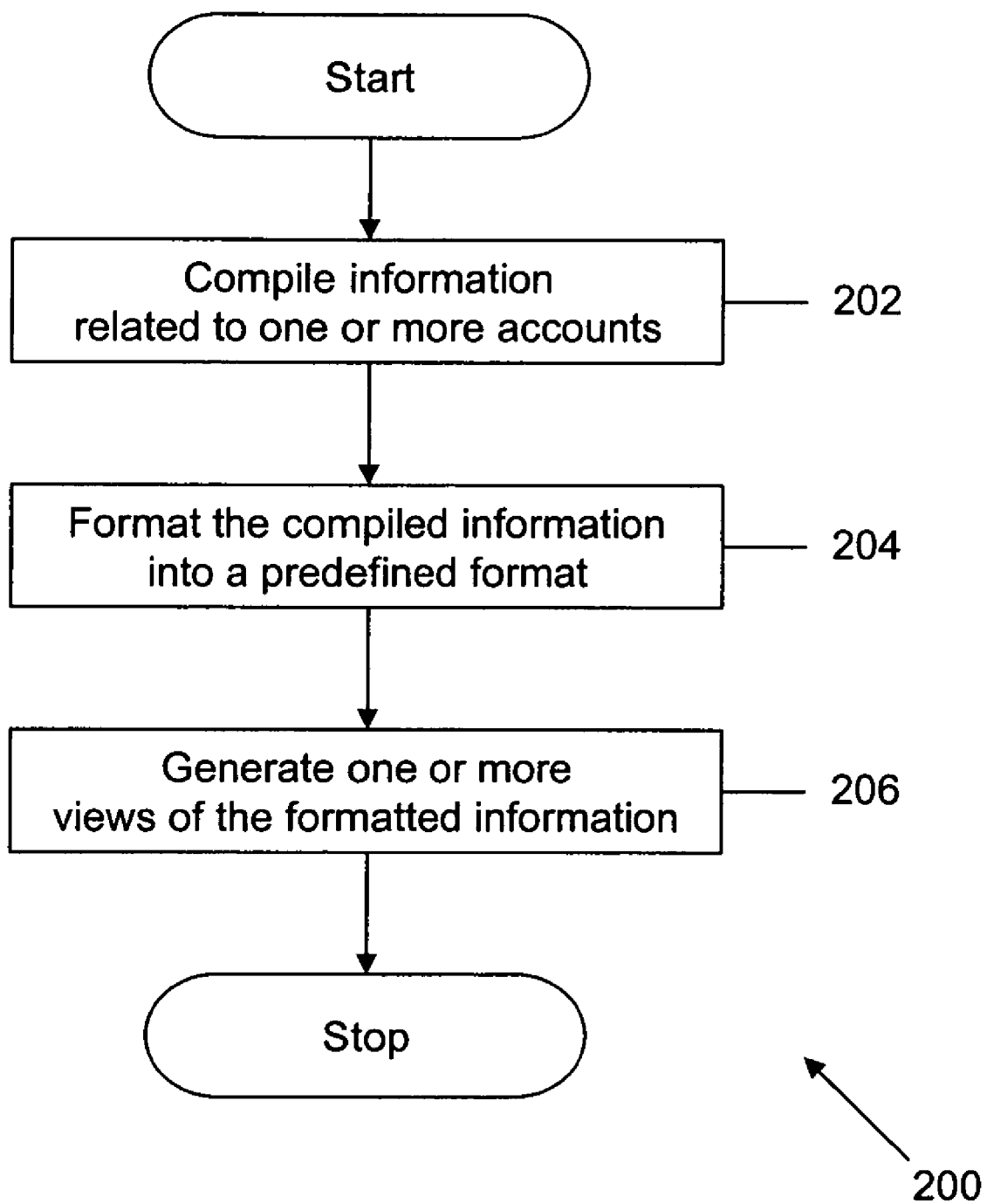
FIG. 2 is a flowchart illustrating a process for managing information related to accounts of one or more business units according to an embodiment of the present invention.

Referring to FIG. 2, a flowchart illustrating a process 200 for managing information related to one or more accounts of one or more business units, according to one embodiment of the present invention, is shown.

Process 200 begins at step 202, where information related to the accounts of the business units is compiled in a first predefined format. In accordance with an embodiment of the invention, the information may be compiled by using a compiling module such as compiling module 104. In accordance with another embodiment of the invention, the information may be compiled by an information management team. Further, the first predefined format may be, for example, an MS Excel format, an MS Access format, or the like. At step 204, the compiled information is converted into a second predefined format and the compiled information is uploaded on a database such as database 108. Examples of the second predefined format may include a WK4 format, an MS Access format, or the like. The second predefined format may be selected based on, for example, the type of database. For example, for uploading the information on a Lotus Notes database, the information may be converted into a WK4 format. At step 206, one or more views of the information included in the database are generated. These one or more views are generated based on the user privileges. The user privileges may be based on, for example, the category of the user, the type of the business unit, or the like. Herein, the views are similar to user interfaces 114 as described in conjunction with FIG. 1. The views may be connected to database 108 and may enable a user to interact with the database.

Figure 3:
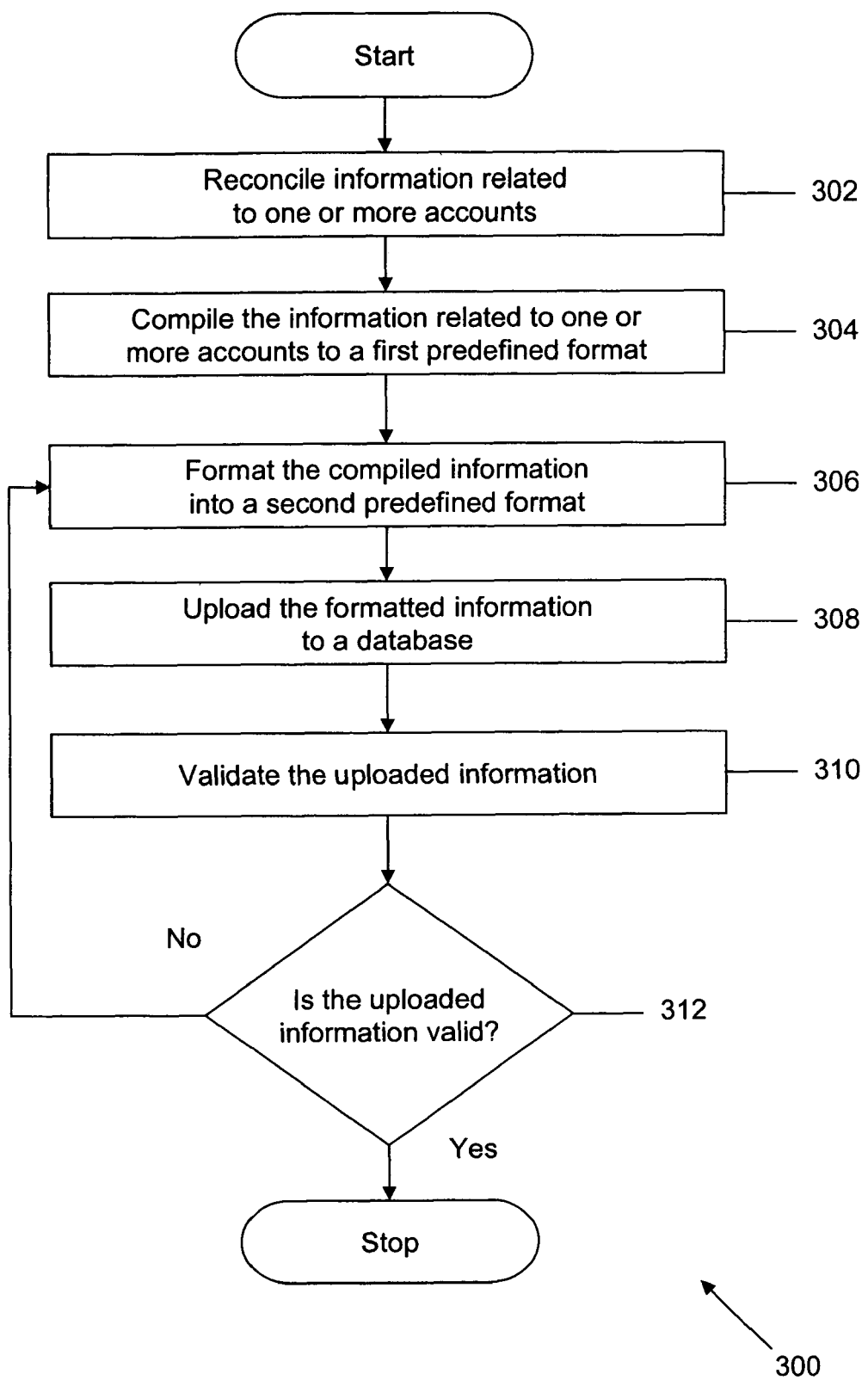
FIG. 3 is a flowchart illustrating the process for managing information related to accounts of one or more business units according to another embodiment of the present invention.

Referring to FIG. 3, a flowchart illustrating a process 300 for managing information related to one or more accounts of one or more business units, according to another embodiment of the present invention, is shown.

Process 300 begins at step 302, where information related to accounts of one or more business units is reconciled. The reconciliation of the information may include, for example, validating the accuracy of the information, or the like. In accordance with an embodiment of the invention, a reconciliation system such as reconciliation system 102 may reconcile the information. In accordance with another embodiment of the invention, the reconciliation may be preformed manually by, for example, a data reconciliation team. At step 304, the reconciled information is compiled. In accordance with an embodiment of the invention, a compiling module such as compiling module 104 compiles the information. In accordance with another embodiment of the invention, the reconciled information may be compiled manually by, for example, an information management team. The compilation may include, for example, consolidating the reconciled information to prepare one or more files in a first predefined format. The first predefined format may be, for example, an MS Excel format, an MS Access format, or the like.

At step 306, the compiled information is converted to a second predefined format. At step 308, the information in the second predefined format is uploaded on a database such as database 108. The second predefined format may be based on, for example, the type of the database. For example, the compiled information is converted to a WK4 format in order to upload the information on a Lotus Notes database. In accordance with an embodiment of the invention, uploading the information on the database may be performed, for example, through administrative interface 112. In accordance with an embodiment of the present invention, step 308 may also include deleting information present in the database. This information may be the information that may not be useful for monitoring the performance of business units. For example, previous month's information related to the accounts may be deleted. Step 308 may also include updating the information present on the database.

Thereafter, at step 310, the information uploaded on the database is validated by, for example, performing information checks on the information, comparing the information with predefined standards, or the like. In accordance with an embodiment of the invention, the information checks performed on the uploaded information may include checking the accuracy of the information. In accordance with an embodiment of the invention, the predefined standards may be Global Card Data Financial standards (CDF88). In accordance with an embodiment of the invention, the validation may be performed by using a validating module such as validating module 110. In accordance with another embodiment of the invention, the validation may be performed manually by, for example, the information management team. At step 312, the validation status of the information is checked. If the formatted information is invalid, step 306 is performed. In an embodiment of the invention, a confirmation of information uploaded to the database may be sent to the users. In accordance with an embodiment of the invention, the users may include account owners responsible for one or more business units. The user may access the information included in the database by using user interfaces such as user interfaces 114.

IV. Example Implementations

Figure 4:
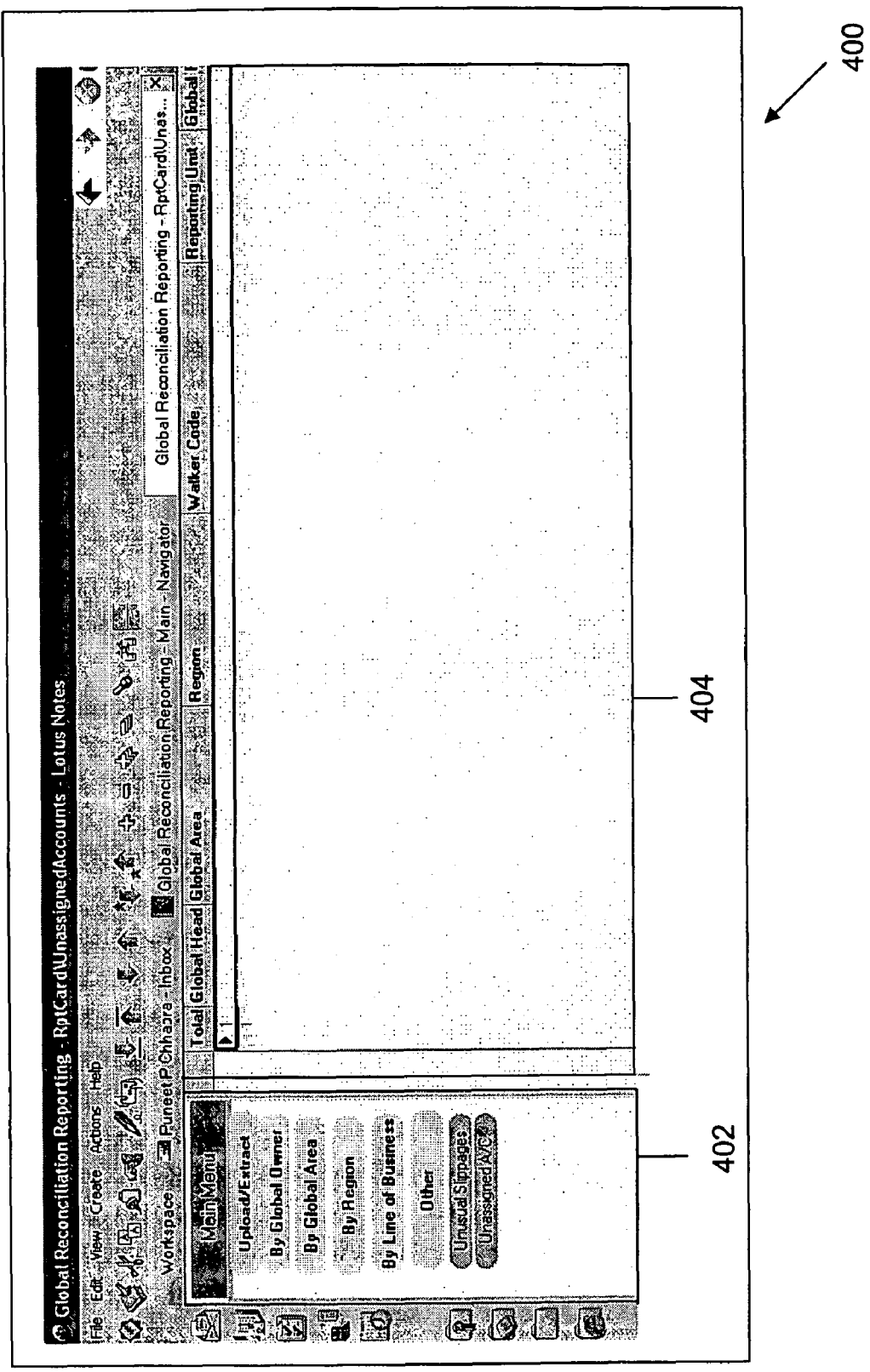
FIG. 4 is an exemplary window or screen shot generated by the graphical user interface of the present invention.
Figure 5:
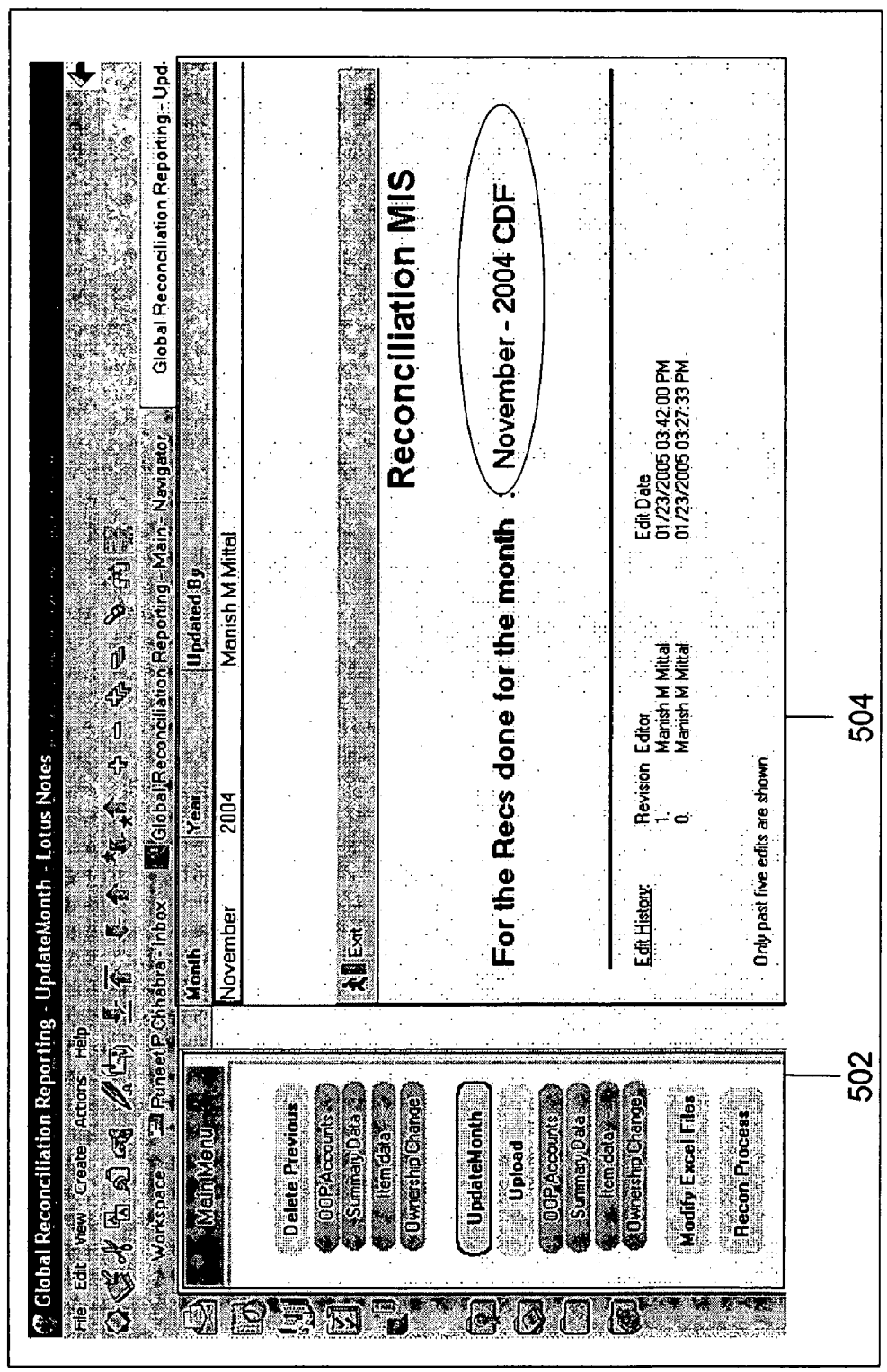
FIG. 5 is another exemplary window or screen shot generated by the graphical user interface of the present invention.
Figure 6:
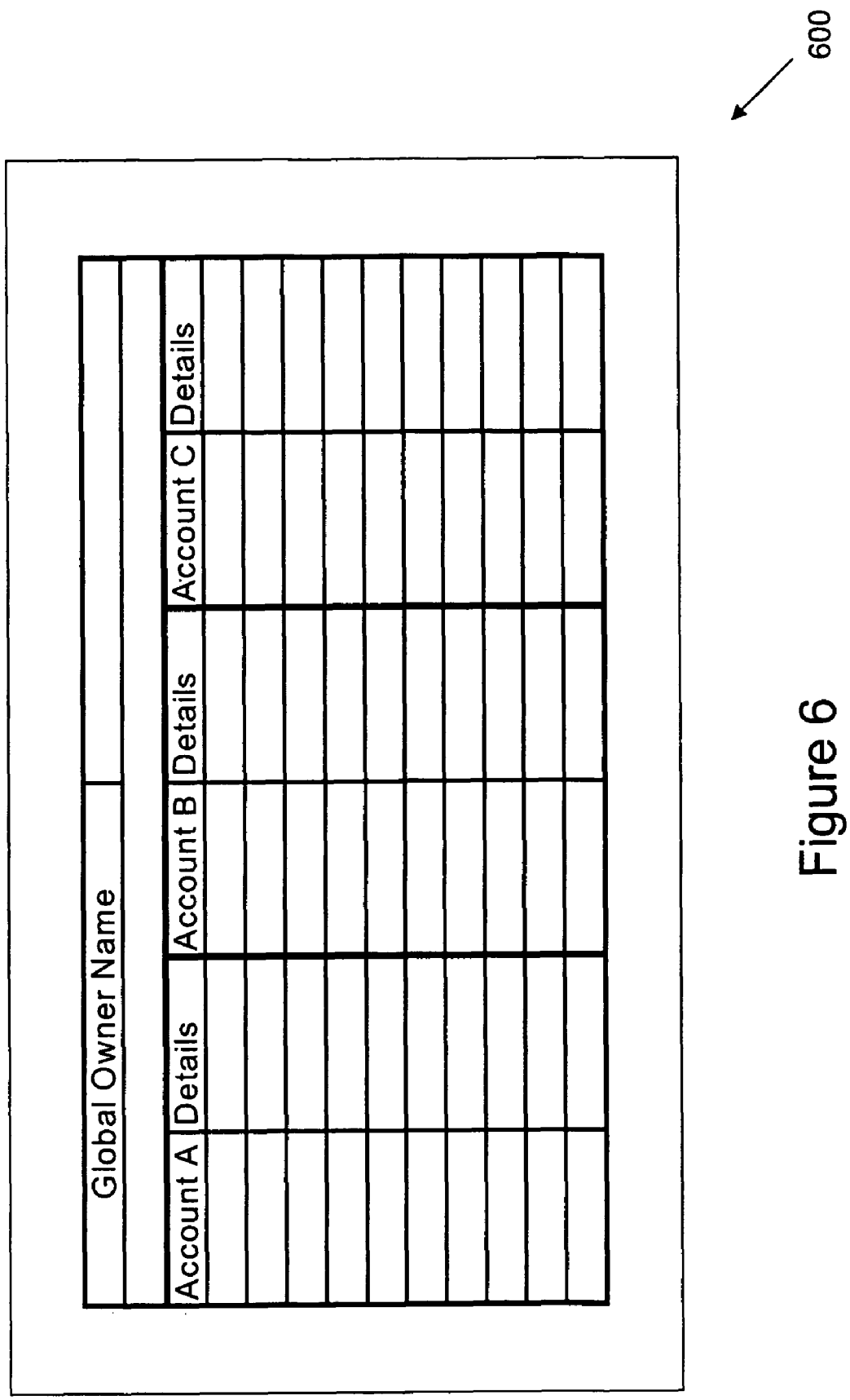
FIG. 6 is yet another exemplary window or screen shot generated by the graphical user interface of the present invention.

Different views of the information included in a database such as database 108, based on the category of a user, are explained herein with FIGS. 4-6. Referring to FIG. 4, an exemplary window or screen shot 400 generated by a graphical user interface, such as user interface 114, is shown. Screen shot 400 enables a user to access the information included in database 108. The user may be, for example, a process owner, an account owner, or the like. Screen shot 400 includes a first section 402 and a second section 404. Section 402 includes various menu options such as UPLOAD/EXTRACT, BY GLOBAL OWNER, BY GLOBAL AREA and BY REGION to generate a customized view of the information to be viewed. Section 404 is a screen which provides information related to balance sheet accounts of one or more business units based on the option selected in section 402.

In accordance with an embodiment of the invention, an authorization check is performed to identify the access privileges of the user before displaying the information. For example, information related to the accounts of one or more business units may be extracted or uploaded only by an information management team by clicking on the UPLOAD/EXTRACT option. An account owner may view the information related to business units for which the account owner is responsible, by clicking on the option BY GLOBAL OWNER. The view for the account owner is further explained below with reference to FIG. 6. Further, the information may also be displayed based on the geographical location of the business units by clicking on the options BY GLOBAL AREA and BY REGION. Information related to a particular line of business, for example, banking may be displayed in section 404 by clicking on the button BY LINE OF BUSINESS.

FIG. 5 shows another exemplary window or screen shot 500 generated by a graphical user interface, such as administrative interface 112, according to an embodiment of the present invention. Screen shot 500 may be used by an information management team for managing database 108. Screen shot 500 includes a first section 502 and a second section 504. Section 502 consists of various options by which the information included in database 108 may be managed. Section 502 includes menu options such as DELETE PREVIOUS, UPLOAD and UPDATE MONTH which may be used for managing the information included in database 108. For example, the information older than a predefined period, for example, one month may be deleted by clicking on the option DELETE PREVIOUS. Also, information may be uploaded on database 108 by clicking on the option UPLOAD. Various other options provided in section 502 may include MODIFY EXCEL FILES. The information may be added or modified on database 108 by using the option MODIFY EXCEL FILES. Section 504 provides reconciliation reporting information.

Referring to FIG. 6, another exemplary window or screen shot 600 generated by the graphical user interface, according to an embodiment of the present invention, is shown. Screen shot 600 is a Graphical User Interface (GUI) such as user interface 114. In accordance with an embodiment of the invention, screen shot 600 is a view of the information in database 108 as presented to an account owner.

Screen shot 600 includes a datasheet that includes financial information related to the business units for which the account owner is responsible. For example, the datasheet as shown in FIG. 6 provides financial information related to business units A, B and C for which the account owner is responsible. For the purpose of review, the account owner may extract the datasheet. In accordance with an embodiment of the invention, the account owner may modify the extracted copy of the datasheet but may not modify the datasheet on database 108.

Figure 7:
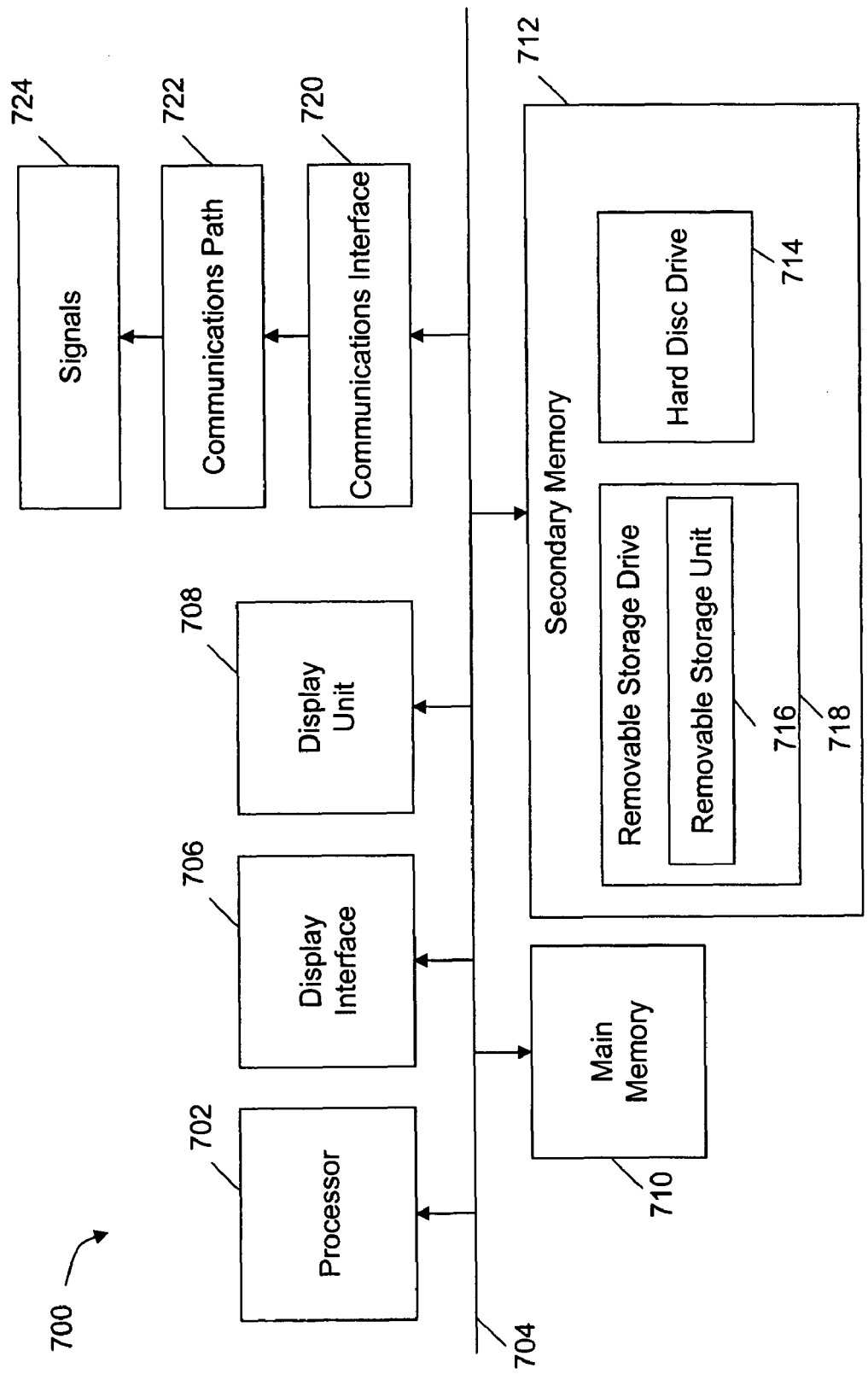
FIG. 7 is a block diagram of an exemplary computer system useful for implementing the present invention.

The present invention (i.e., system 100, process 200 or any part(s) or function(s) thereof) may be implemented using hardware, software or a combination thereof and may be implemented in one or more computer systems or other processing systems. However, the manipulations performed by the present invention are often referred to herein in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices, such as a computer system 700, as shown in FIG. 7.

Computer system 700 includes one or more processors, such as processor 702. Processor 702 is connected to a communication infrastructure 704 (e.g., a communication bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 706 that forwards graphics, text, and other data from communication infrastructure 704 (or from a frame buffer not shown) for display on a display unit 708.

Computer system 700 also includes a main memory 710, preferably random access memory (RAM), and may also include a secondary memory 712. Secondary memory 712 may include, for example, a hard disk drive 714 and/or a removable storage drive 716, representing a floppy disk drive, a magnetic tape drive, an optical disk drive, etc. Removable storage drive 716 reads from and/or writes to a removable storage unit 718 in a well known manner. Removable storage unit 718 represents a floppy disk, magnetic tape, optical disk, etc., which is read, and written to, by removable storage drive 716. As will be appreciated, removable storage unit 718 includes a computer usable storage medium having stored therein computer software and/or data.

In alternative embodiments, secondary memory 712 may include other similar devices for allowing computer programs or other instructions to be loaded into computer system 700. Such devices may include, for example, a removable storage unit and an interface. Examples of such may include a program cartridge and cartridge interface (such as that found in video game devices), a removable memory chip (such as an erasable programmable read only memory (EPROM), flash memory, or programmable read only memory (PROM)) and associated socket, and other removable storage units and interfaces, which allow software and data to be transferred from the removable storage unit to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a Personal Computer Memory Card International Association (PCMCIA) slot and card, etc. Software and data transferred via communications interface 720 are in the form of signals 724 which may be electronic, electromagnetic, optical or other signals capable of being received by communications interface 720. These signals 724 are provided to communications interface 720 via a communications path (e.g., channel) 722. This communications path 722 carries signals 724 and may be implemented using wire or cable, fiber optics, a telephone line, a cellular link, an radio frequency (RF) link and/or other communications channel.

In this document, the terms computer program medium and computer usable medium are used to generally refer to media such as removable storage drive 716, a hard disk installed in hard disk drive 714, and signals 724. These computer program products provide software to computer system 700. The invention is directed to such computer program products.

Computer programs (also referred to as computer control logic) are stored in main memory 710 and/or secondary memory 712. Computer programs may also be received via communications interface 720. Such computer programs, when executed, enable computer system 700 to perform the features of the present invention, as discussed herein. In particular, the computer programs, when executed, enable processor 702 to perform the features of the present invention. Accordingly, such computer programs represent controllers of computer system 700.

In an embodiment where the invention is implemented using software, the software may be stored in a computer program product and loaded into computer system 700 using removable storage drive 716, hard disk drive 714 or communications interface 720. The control logic (software), when executed by processor 702, causes processor 702 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for managing information related to an account of a business unit, comprising:
    electronically compiling information related to the account;
    electronically converting the compiled information into a predefined format;
    electronically validating the compiled information according to one or more predefined standards;
    electronically correcting information that is not in compliance with the one or more predefined standards;
    electronically reconciling the information related to the account; and
    electronically generating a view of the compiled information based on privileges associated with a user, wherein the view provides the user with access to the compiled information.

2. The method of claim 1, further comprising electronically updating the compiled information after a predefined time interval.

3. The method of claim 1, wherein the account comprises a balance sheet account including financial information related to the business unit.

4. The method of claim 1,
    wherein the compiling step comprises compiling information related to a plurality of accounts corresponding to one or more business units;
    wherein the converting step comprises converting the compiled information into one or more predefined formats; and
    wherein the generating step comprises generating one or more views of the compiled information.

5. The method of claim 1, further comprising using the information to ensure compliance with one or more regulatory practices.

6. A system for managing information related to an account associated with a business unit, comprising:
    a processor;
    a memory having stored thereon:
        a compiling module to compile information related to the account;
        a formatting module to convert the compiled information into a predefined format;
        a validating module to validate the compiled information according to one or more predefined standards and correct information that is not in compliance with the one or more predefined standards;
        a reconciliation module to reconcile the information related to account; and
        a user interface to provide access for a user to the compiled information based on the privileges associated with the user.

7. The system of claim 6, further comprising an updating module to update the compiled information.

8. The system of claim 6,
    wherein the compiling module compiles information related to a plurality of accounts corresponding to one or more business units;
    wherein the formatting module converts the compiled information into one or more predefined formats; and
    wherein the user interface provides one or more views of the compiled information.

9. A computer program product comprising a computer usable medium having control logic stored therein for causing a computer to manage information of accounts of one or more business units, the control logic comprising:
    first computer readable program code means for causing the computer to compile information related to one or more accounts;
    second computer readable program code means for causing the computer to convert the compiled information into a predefined format;
    third computer readable program code means for causing the computer to validate the compiled information according to one or more predefined standards;
    fourth computer readable program code means for causing the computer to correct information that is not in compliance with the one or more predefined standards;
    fifth computer readable program code means for causing the computer to reconcile the information related to the one or more accounts; and
    sixth computer readable program code means for causing the computer to generate one or more views of the compiled information based on user privileges, wherein the one or more views provide access to the compiled information to one or more users.

10. The computer program product of claim 9, further comprising sixth computer readable program code means for causing the computer to update the compiled information related to the one or more accounts.

* * * * *